Aug. 25, 1931.     E. L. HOUGH     1,820,803
METHOD OF AND APPARATUS FOR STARTING ALTERNATING CURRENT MOTORS
Filed Jan. 14, 1927
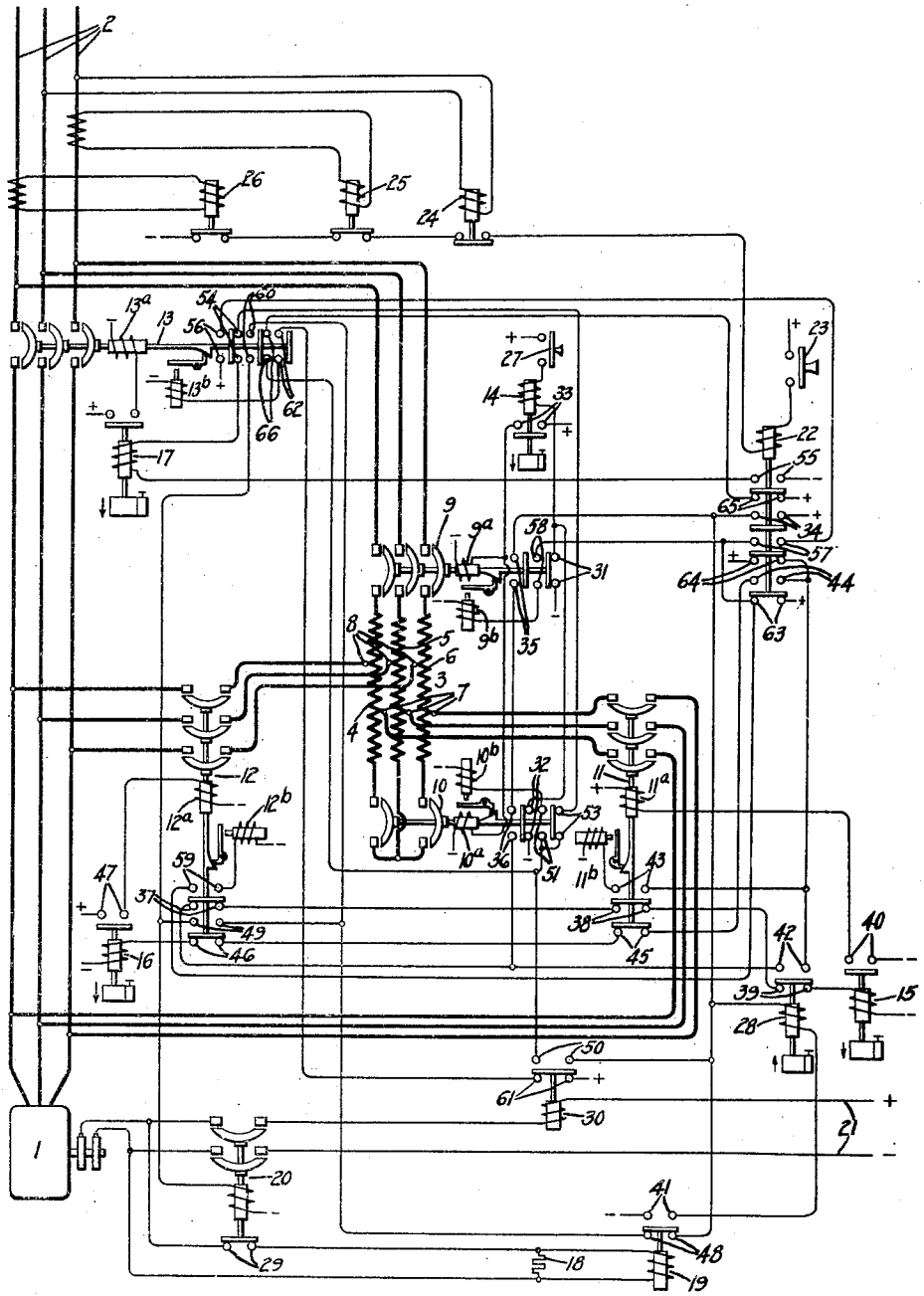
Inventor:
Eugene L. Hough,
by *Alexander F. ...*
His Attorney.

Patented Aug. 25, 1931

1,820,803

UNITED STATES PATENT OFFICE

EUGENE L. HOUGH, OF ST. LOUIS, MISSOURI, ASSIGNOR TO GENERAL ELECTRIC COMPANY, A CORPORATION OF NEW YORK

METHOD OF AND APPARATUS FOR STARTING ALTERNATING CURRENT MOTORS

Application filed January 14, 1927. Serial No. 161,194.

My invention relates to the starting of motors and particularly to the starting of alternating current motors and its object is to provide an improved method and arrangement of apparatus for effecting the starting of alternating current motors under heavy load.

My invention will be better understood from the following description, taken in connection with the accompanying drawing, and its scope will be pointed out in the appended claims.

In the accompanying drawing, which shows diagrammatically an automatic switching equipment for starting a synchronous motor, 1 represents a polyphase synchronous motor, and 2 represents a source of polyphase current shown as a three-phase supply circuit, from which the motor 1 is adapted to receive current. 3 is an auto-transformer which is provided with the windings 4, 5, 6, having the low voltage taps 7 and the high voltage taps 8.

9 is a circuit breaker which, when closed, connects one end of the windings 4, 5 and 6 to the supply circuit 2, and 10 is a circuit breaker which, when closed, connects together the other ends of the windings 4, 5 and 6. 11, 12 and 13 are circuit breakers which, when closed, respectively connect the motor 1 to the low voltage taps 7 to the high voltage taps 8 and to the supply circuit 2 directly.

The circuit breakers 9 to 13 inclusive may be any suitable type of switching means, examples of which are well known in the art. As shown, the circuit breakers 9 to 13 inclusive, of the latched-in type, are respectively provided with closing coils 9a to 13a inclusive, and with tripping coils 9b to 13b inclusive. The circuits of the closing coils 9a and 10a are controlled by a hesitating control relay 14 and the closing coils 11a, 12a and 13a are respectively controlled by the hesitating control relays 15, 16 and 17.

The circuit of the field winding of the synchronous motor 1, when the motor is at rest, is completed through a discharge resistor 18, across which is connected the coil of a control relay 19. 20 is a switching device which is arranged to open the circuit of the motor field winding through the resistor 18 and the relay 19, and to connect the field winding to a suitable source of direct current 21.

For controlling the operation of the various circuit breakers and switches so that they operate in the correct sequence to effect the proper starting of the motor, I provide a master relay 22 which is energized whenever it is desired to have the motor in operation, and is deenergized when it is desired to stop the motor. As shown, the circuit of the relay 22 is controlled by a hand switch 23, which has to be closed in order to start the motor. The circuit of the relay 22 is also controlled by a voltage relay 24, and the overload relays 25 and 26, which are so connected to the supply circuit 2 that the motor cannot be started if the supply voltage is low and the motor is disconnected from the supply circuit if the motor becomes overloaded while in operation. The relay 22, when energized, effects the closing of the circuit breaker 11 if the circuit breakers 9 and 10 are closed. The closing of the circuit breakers 9 and 10 is arranged to be effected by the closing of a control switch 27 in the circuit of the hesitating control relay 14. A time relay 28, which is energized in response to the operation of the relay 22, effects, after a predetermined time, the opening of the circuit breaker 11 and the closing of the circuit breaker 12 so that the motor is connected to the relatively high voltage taps 8 on the auto-transformer. When the speed of the motor reaches a predetermined value, the relay 19 operates to effect the closing of the circuit breaker 20, so that the motor field is excited with direct current and the motor is pulled into synchronism. Auxiliary contacts 29 on the breaker 20 are operated to effect the disconnection of the resistor 18 and the relay 19 from across the terminals of the motor field winding. 30 is a relay which is so connected in the field circuit that when the direct current through the field winding builds up to a predetermined value, it effects the opening of the circuit breaker 10, then the closing of the circuit breaker 13, and then the opening of the circuit breakers 9 and 12, so that first the motor is connected to the supply circuit 2 with a portion of the windings 4, 5 and 6 in series therewith, which function as series reactors, and then the motor is connected directly to the supply circut 2.

The operation of the system shown is as follows: When it is desired to start the motor 1, the switch 27 is first closed, and then opened, and the switch 23 is closed.

The closing of the contacts of the switch 27 completes a circuit for the hesitating control relay 14 to effect the closing of the circuit breakers 9 and 10. The circuit of the relay 14 is from one side of a suitable control circuit, through contacts of switch 27, coil of relay 14, auxiliary contacts 31 on circuit breaker 9 and auxiliary contacts 32 on circuit breaker 10 in parallel to the other side of the control circuit. The closing of the contacts 33 of relay 14 completes the circuits of closing coils 9a and 10a, so that the auto-transformer is connected across the supply circuit.

The closing of the contacts of switch 23 completes the circuit of master relay 22 if the voltage of the supply circuit exceeds a predetermined value. The circuit of relay 22 is from one side of a suitable control relay 23, contacts of relays 24, 25 and 26 in series to the other side of the control circuit. With the circuit breakers 9 and 10 closed and the contacts 34 of the master relay 22 closed, a circuit is completed for the control relay 15 to effect the closing of the circuit breaker 11 so as to connect the motor to the relatively low voltage tap 7 on the auto-transformer. The circuit of the relay is from one side of the suitable control circuit, through contacts 34 of the master relay, auxiliary contacts 35 on the circuit breaker 9, auxiliary contacts 36 on the circuit breaker 10, auxiliary contacts 37 on the circuit breaker 12, auxiliary contacts 38 on the circuit breaker 11, contacts 39 of the time relay 28, coil of relay 15 to the other side of the control circuit. The closing of the contacts 40 of the relay 15 completes the circuit of the closing coil 11a so that the circuit breaker 11 closes.

As soon as the circuit breaker 11 closes, a voltage is induced in the field winding of the motor, which is an alternating current voltage and has a frequency equal to the slip of the motor. This current of slip frequency causes the relay 19 to operate and close its contacts 41. The relay 19 is so designed that it maintains its contacts 41 closed until the motor has accelerated to approximately synchronous speed.

The closing of the contacts 41 completes a circuit for the time relay 28 from one side of a suitable control circuit, through contacts 34, coil of relay 28, contacts 41 of relay 19 to the other side of the control circuit. After a predetermined time, relay 28 opens its contacts 39 and closes its contacts 42 to complete the circuit of the tripping coil 11b so as to effect the opening of the circuit breaker 11. The circuit of the tripping coil 11b is from one side of a control circuit, through contacts 34 of relay 22, auxiliary contacts 35 on circuit breaker 9, auxiliary contacts 36 on circuit breaker 10, contacts 42 of relay 28, auxiliary contacts 43 on circuit breaker 11, tripping coil 11b to the other side of the control circuit.

As soon as the circuit breaker 11 opens, a circuit is completed for the hesitating control relay 16. This circuit is from one side of a control circuit, through contacts 34 of the relay 22, auxiliary contacts 35 on the circuit breaker 9, auxiliary contacts 36 on the circuit breaker 10, contacts 42 of the relay 28, contacts 44 of the relay 22, auxiliary contacts 45 on the circuit breaker 11, auxiliary contacts 46 on the circuit breaker 12, coil of relay 16 to the other side of the control circuit. The relay 16, by closing its contacts 47, completes the circuit of the closing coil 12a so that the circuit breaker 12 is closed to connect the motor 1 to the high voltage taps 8 on the auto-transformer.

When the motor reaches approximately synchronous speed, relay 19 operates to open its contacts 41 and to close its contacts 48 to effect the operation of the circuit breaker 20 so that the motor field winding is excited from the direct current circuit 21. The circuit of the coil of the circuit breaker 20 is from one side of a control circuit, through contacts 34 of the relay 22, contacts 48 of the relay 19, auxiliary contacts 49 on the circuit breaker 12, coil of circuit breaker 20 to the other side of the control circuit. The circuit breaker 20, by opening its auxiliary contacts 29 disconnects the resistor 18 and the relay 19 from across the terminals of the motor field winding.

As soon as the direct current in the motor field builds up to a predetermined value, field relay 30 closes its contacts 50 and completes a circuit for the tripping coil 10b to effect the opening of the circuit breaker 10. The circuit of the tripping coil 10b is from one side of a control circuit, through contacts 34 of relay 22, contacts 50 of relay 30, auxiliary contacts 51 on the circuit breaker 10, tripping coil 10b to the other side of the control circuit.

When the circuit breaker 10 opens, the motor 1 is connected to the supply circuit 2 with portions of the auto-transformer windings 4, 5 and 6 in series therewith so that they function as series reactors.

After the circuit breaker 10 opens, a circuit is completed for the hesitating control relay 17. This circuit is from one side of a control circuit, through contacts 34 of relay 22, contacts 50 of relay 30, auxiliary contacts 53 on circuit breaker 10, auxiliary contacts 54 on circuit breaker 13, coil of relay 17, contacts 55 of relay 22 to the other side of the control circuit.

The control relay 17 completes the circuit of the closing coil 13a of the circuit breaker 13 to effect the closing of the circuit breaker 13 and the direct connection of the motor 1 to the supply circuit 2.

The closing of the auxiliary contacts 56 on the circuit 13 completes the circuits of the tripping coils 9b and 12b so that the circuit breakers 9 and 12 are opened and the auto-transformer is disconnected from the supply circuit. These circuits are from one side of a control circuit through auxiliary contacts 56 on circuit breaker 13, contacts 57 of relay 22 and then one circuit is through auxiliary contacts 58 on circuit breaker 9 and tripping coils 9b to the other side of the control circuit, and the other circuit is through auxiliary contacts 59 on circuit breaker 12, and tripping coil 12b to the other side of the control circuit.

The circuit breaker 13, by closing its auxiliary contacts 60, completes a circuit around the auxiliary contacts 49 on circuit breaker 12 so that the switch 20 is not opened by the opening of the circuit breaker 12.

When it is desired to stop the motor 1 while it is in operation, the switch 23 is opened so that the relay 22 is deenergized. The relay 22, by opening its contacts 34, interrupts the circuit of the circuit breaker 20 so that the motor field winding is disconnected from the direct current circuit 21. Consequently, field relay 30 becomes deenergized, and by closing its contacts 61 completes the circuit of the tripping coil 13b through auxiliary contacts 62 on the circuit breaker 13.

If the master relay 22 is deenergized while either of the circuit breakers 9 or 12 is closed, the closing of the relay contacts 63 completes the circuit of the respective tripping coil. Also, if the relay 22 is deenergized while the circuit breaker 11 is closed, a circuit for its tripping coil 11b is completed through contacts 64 of the relay 22, and if the relay 22 is deenergized while the circuit breaker 10 is closed, a circuit for its tripping coil 10b is completed through contacts 65 of the relay 22 and auxiliary contacts 66 on circuit breaker 13.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is,—

1. In combination, an alternating current source, an alternating current motor, an auto-transformer, a plurality of switching devices for controlling the interconnection of said source, auto-transformer and motor, means for effecting the operation of said devices so that said motor is connected to relatively low voltage taps of said auto-transformer, means for effecting the operation of said devices so that said motor is connected to relatively high voltage taps of said auto-transformer, means responsive to a predetermined condition of said motor for effecting the operation of certain of said devices in such a manner that said motor is connected to said source with a portion of the auto-transformer winding connected in series therewith so that it functions as a series reactor, and means responsive to another predetermined condition of said motor for connecting said motor directly to said source.

2. In combination, an alternating current source, an alternating current motor, an auto-transformer, a plurality of switches for controlling the interconnection of said source, auto-transformer and motor, means for effecting the operation of certain of said switches so that said motor is connected to relatively low voltage taps on said auto-transformer, means for effecting the operation of certain of said switches so that said motor is disconnected from said relatively low voltage taps on said auto-transformer and is connected to relatively high voltage taps on said auto-transformer, speed responsive means for controlling the operation of certain of said switches so that said motor is connected to said source with a portion of the auto-transformer winding connected in series therewith when the speed of said motor is above a predetermined value, and means responsive to a predetermined condition of said motor for effecting the operation of certain of said switches so that said motor is connected directly to said source and the series circuit between said motor and source through the auto-transformer winding is opened.

3. In combination, an alternating current source, a synchronous motor, an auto-transformer having low voltage taps and high voltage taps, a plurality of switches for controlling the interconnection of said source, motor and auto-transformer, means for effecting the operation of certain of said switches so that said motor is connected to the low voltage taps on said auto-transformer, means for effecting the operation of certain of said switches after said motor has been connected to the low voltage taps on said auto-transformer for disconnecting said motor from said low voltage taps and for connecting said motor to said high voltage taps on said auto-transformer, speed responsive means for effecting the energization of the field winding of said motor from a source of direct current, means responsive to the amount of direct current in the field winding of said motor for effecting the operation of certain of said switches first to connect said motor to said source with a portion of the winding of said auto-transformer in series therewith so that it functions as a series reactor and subsequently to connect said motor directly to said source.

4. In combination, a source of alternating current, an alternating current motor, an auto-transformer provided with low voltage and high voltage taps, switching means for connecting said auto-transformer to said source and said motor to said low voltage taps, means responsive to a predetermined condition of said motor for effecting the disconnection of said motor from said low voltage taps and the connection of said motor to said high voltage taps, and means responsive to other predetermined conditions of said motor for automatically effecting the connection of said motor to said source with a portion of the winding of said autotransformer in series therewith so that it functions as a series reactor and the subsequent connection of said motor directly to said source.

5. In combination, a source of alternating current, an alternating current motor, an autotransformer provided with low voltage and high voltage taps, switching means for connecting said autotransformer to said source and said motor to said low voltage taps, timing means responsive to the operation of said switching means for effecting the disconnection of said motor from said low voltage taps and the connection of said motor to said high voltage taps after said motor has been connected to said low voltage taps for a predetermined time, and means responsive to predetermined conditions of said motor for automatically effecting the connection of said motor to said source with a portion of the winding of said auto-transformer in series therewith so that it functions as a series reactor and the subsequent connection of said motor directly to said source.

In witness whereof, I have hereunto set my hand this eleventh day of January, 1927.

EUGENE L. HOUGH.